United States Patent
Hoffman et al.

(10) Patent No.: US 10,878,143 B2
(45) Date of Patent: Dec. 29, 2020

(54) SIMULATING SELECTIVE PARTICIPATION OF MULTIPLE EVENTS FROM A POOL OF QUALIFIED PARTICIPANTS

(71) Applicant: INTERNATIONAL BUSINESS MACHINES CORPORATION, Armonk, NY (US)

(72) Inventors: David Hoffman, Raleigh, NC (US); Feng Li, Beijing (CN); Ta-Hsin Li, Danbury, CT (US); Nianjun Zhou, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 298 days.

(21) Appl. No.: 15/482,585

(22) Filed: Apr. 7, 2017

(65) Prior Publication Data
US 2018/0293337 A1    Oct. 11, 2018

(51) Int. Cl.
*G06F 30/20* (2020.01)
*G06F 17/10* (2006.01)
(Continued)

(52) U.S. Cl.
CPC .............. *G06F 30/20* (2020.01); *G06F 17/10* (2013.01); *G06Q 10/067* (2013.01); *G06Q 10/10* (2013.01);
(Continued)

(58) Field of Classification Search
CPC .. G06F 17/5009; G06F 17/10; G06F 2217/16; G06Q 30/0279; G06Q 10/10; G06Q 10/067; G06Q 50/01
See application file for complete search history.

(56) References Cited

U.S. PATENT DOCUMENTS

2010/0241476 A1* 9/2010 Fitzpatrick ............. G06Q 10/10
                                                                    705/7.18
2013/0262191 A1 10/2013 Nagarajan
(Continued)

OTHER PUBLICATIONS

Boutsis, Ioannis et al., "Personalized Event Recommendations using Social Networks," 2015 16th IEEE Conference on Mobile Data Management, pp. 84-93 (Year: 2015).*

(Continued)

*Primary Examiner* — Rehana Perveen
*Assistant Examiner* — Steven W Crabb
(74) *Attorney, Agent, or Firm* — F. Chau & Associates, LLC

(57) ABSTRACT

A method for simulating participation patterns in a plurality of events from a pool of qualified participants includes selecting an event whose preference rank r is equal to a predetermined preference rank R(i,j) for an event of type j for individual i; sampling a random number Z that represents a number of events in which to participate when a number N(j) of available events of type j is greater than 0 and an expected participation rate P(i, j) of individual i for events of type j is greater than 0; selecting a random subset S with Z elements that indicates which Z events to participate in; and looping over k=1 to N(j) and setting a participation array M(i,j,k,l) to 1 iff k is contained in S, where participation array M(i,j,k,l) indicates whether or not individual i participates in a k-th event of type j in an l-th simulation.

19 Claims, 8 Drawing Sheets

Rank of Event Types Derived from the H Scores and the Hierarchy

(51) Int. Cl.
  *G06Q 50/00*   (2012.01)
  *G06Q 10/06*   (2012.01)
  *G06Q 10/10*   (2012.01)
  *G06Q 30/02*   (2012.01)
  *G06F 111/10*  (2020.01)
(52) U.S. Cl.
  CPC ......... *G06Q 30/0279* (2013.01); *G06Q 50/01* (2013.01); *G06F 2111/10* (2020.01)

(56) References Cited

U.S. PATENT DOCUMENTS

| | | |
|---|---|---|
| 2016/0162911 A1 | 6/2016 | Chao et al. |
| 2017/0154359 A1* | 6/2017 | Zukerman .......... G06Q 30/0252 |

OTHER PUBLICATIONS

Alaeddini, Adel et al., "A probabilistic model for predicting the probability of no-show in hospital appointments," Health Care Management Science 14: 146-157 (Year: 2011).*

Buecheler, Thierry, Rocky Lonigro, Rudolf M. Füchslin, and Rolf Pfeifer. "Modeling and simulating crowdsourcing as a complex biological system: human crowds manifesting collective intelligence on the internet." In ECAL, pp. 109-116. 2011.

\* cited by examiner

SIMULATING SELECTIVE PARTICIPATION OF MULTIPLE EVENTS FROM A POOL OF QUALIFIED PARTICIPANTS

BACKGROUND

In various scenarios which rely on voluntary self selection, such as temporary work assignments, to understand the potential level of coverage, it is useful to be able to predict the capacity, or number of participants, who will volunteer for the event. This requires understanding the pool of volunteers, their qualifications, and their proclivity to participate.

Examples of selective participation events include business events that permit voluntary but selective participation, where the potential participant members have free choice which events to attend and how many events to attend but also must meet the required qualifications. Further examples include crowd sourced work assignments or temporary work that require pre-qualification that allow professionals from a vetted resource pool to participate. Multiple projects exist for these participants to choose from, with some requiring similar skills and others requiring different skill sets. Each candidate must be qualified, available, and willing to participate. Another example is conference sessions that are attended by registered conference participants. Multiple sessions are typically available on the same or different topics for the audience to choose on a voluntary basis. Further examples include tour packages, in which tourists have multiple choices of visiting different tourist spots, where each spot has its unique value, admission cost and time requirement, and voluntary resource sharing services, such as ride-sharing or apartment-sharing services, which provide multiple choices of goods or services to share.

For event organizers as stakeholders, it is critical to predict the number of participants, especially for risk-based capacity planning purposes. For crowdsourcing projects, it helps to determine whether or not and how many additional resources are needed to keep the risk of low participation at a tolerable level. For conference organizers, it helps to determine suitable venues for the events to keep the risk of over-crowded rooms at a tolerable level.

For event participants as stakeholder, it is critical to decide which event to participate to gain the maximum likelihood of event acceptance and achieving the success of participation in the event. These situations include optimization of freelance workers in selecting the best tasks or short-term job to achieve best economical outcome or utilize the best of their knowledge, and the optimization of tourists in selecting the best activities to achieve the best entrainment enjoyment.

SUMMARY

Embodiments of the present disclosure provide methods and systems for simulating selective participation of multiple from a pool of participants. More specifically, embodiments of the present disclosure provide data-driven methods and systems that simulate participation patterns for different crowdsourcing scenarios from a pool of qualified participants by taking into account a number of key participation characteristics derived from historical event participation records, such as: personalized qualifications; personalized participation rates; personalized preferences of event types; and personalized budget of participation. Further embodiments can calculate key performance indexes (KPI's) for understanding the dynamics of the performance and risk-based capacity planning, such as the determination of the minimum pool size based on overall KPI, and the minimum number of additional qualified members needed based on KPI of a given event type, and can identify the gap between desired performance and current participants, and generate targeted messages or adjust price functions to encourage or discourage participation.

According to an embodiment of the disclosure, there is provided a method for simulating participation patterns in a plurality of events from a pool of qualified participants, including selecting an event whose preference rank r is equal to a predetermined preference rank R(i,j) for an event of type j for individual i, where individual i is qualified to participate in event j; sampling a random number Z from a binomial distribution Binom(N(j), P(i,j)), where Z represents a number of events in which to participate, when a number N(j) of available events of type j is greater than 0 and when an expected participation rate P(i, j) of individual i for events of type j is greater than 0; selecting a random subset S with Z elements from a set of integers {1, . . . , N(j)}, where subset S is an indicator that shows which Z events to participate in; and looping over k=1 to N(j) and setting a participation array M(i,j,k,l) to 1 if and only if k is contained in S, where participation array M(i,j,k,l) is a binary indicator of whether or not individual i participates a k-th event of type j in an l-th run of simulation.

According to a further embodiment of the disclosure, the participation array M(i,j,k,l) is set for all simulations runs l, all individuals i, and all event types j, where l=1 to L, a total number of simulation runs, i=1 to n, a total number of individuals, and there are m event types.

According to a further embodiment of the disclosure, the method includes initializing an individual participation budget D to B(i), a participation budget for the ith individual; setting Z to a largest integer which is less than or equal to D/C(j), if Z×C(j)>D, where C(j) is a cost of event j; and updating the individual participation budget as D=D−Z×C(j).

According to a further embodiment of the disclosure, the method includes calculating an expected number of participants μ(j) per event of type j from $$\mu(j) = \frac{1}{L}\sum_{l=1}^{L}\left\{\frac{1}{N(j)}\sum_{k=1}^{N(j)}\sum_{i=1}^{n} M(i, j, k, l)\right\},$$

where L is a total number of simulation runs.

According to a further embodiment of the disclosure, the method includes calculating a probability ρ(j) of at least one event of type j having no more than x(j) participants from $$\rho(j) = \frac{1}{L}\sum_{l=1}^{L} I\left[\sum_{k=1}^{N(j)} I\left\{\sum_{i=1}^{n} M(i, j, k, l) \le x(j)\right\} > 0\right],$$

where L is a total number of simulation runs, I( ) denotes an indicator function where I(A)=1 if condition A is satisfied and I(A)=0 otherwise, and x(j) is a participation threshold for event type j.

According to a further embodiment of the disclosure, the method includes receiving a pre-classified hierarchy of events of h levels for individual i where nodes in level u, 1≤u≤h, are indexed by $w_u = (v_1, \ldots, v_{u-1}, v_u)$, where $w_{u-1}=(v_1, \ldots, v_{u-1})$ is an index of a parent node and $v_u$ is the index of the child node ($v_u=1, \ldots, |w_{u-1}|$), where $|w_{u-1}|=$a number of children of node $w_{u-1}$, where each node is associated with a hierarchy score that indicates the rank of that node within a hierarchy of nodes at a same level with a common parent node; initializing all nodes of the hierarchy of events to be unvisited and all terminal nodes of the hierarchy of events to be unranked; and starting from a root of the hierarchy of events, visiting all child nodes of the root, where for each child node, the method further includes finding a parent node of a plurality of most preferable unranked terminal nodes; assigning ranks to the most preferable unranked terminal nodes that are children of the parent node; determining the highest assigned rank; marking the parent node as visited; and finding a next unvisited node, where a vector of ranks of the terminal nodes is the preference rank $R(i,j)$ for events of type j for individual i.

According to an embodiment of the disclosure, there is provided a system for simulating participation patterns in a plurality of events from a pool of qualified participants, including a data storage device that includes a plurality of databases; a data processing device; and a display device, where the data processing device includes a simulation engine and a key performance index (KPI) engine, where the simulation engine calculates a participation array $M(i,j,k,l)$ that is a binary indicator of whether or not individual i participates a k-th event of type j in an l-th simulation run from a number of events $N(j)$ of type j available for participation in a given period of time, a cost $C(j)$ of each event of type j to each participant, a binary qualification indicator $Q(i, j)$ of individual i for events of type j, where 1=qualified, and 0=not qualified, an expected participation rate $P(i, j)$ of individual i for events of type j, a participation budget $B(i)$ of individual i, and a preference rank $R(i, j)$ of events of type j for individual i, where rank 1=a most preferred event type, rank m=a least preferred event type, and where the KPI engine calculates key performance indices using the participation array $M(i,j,k,l)$, the number of events $N(j)$ of type j and a participation thresholds $x(j)$ for each event of type j.

According to a further embodiment of the disclosure, the databases stored in the data storage device include an event database, a personal database, a participation database and a key performance index (KPI) database, where the event database stores a classification scheme for events that classifies various types of events, the number of events $N(j)$ of type j and the cost $C(j)$ of each event of type j, the personal database stores identifications of all members of the pool of qualified participants, the binary qualification indicator $Q(i, j)$, the expected participation rate $P(i,j)$, the participation budget $B(i)$, and the preference rank $R(i,j)$, the participation database stores the participation array $M(i,j,k,l)$ and participation thresholds $x(i)$ for each event, and the KPI database stores key performance indices.

According to a further embodiment of the disclosure, the simulation engine outputs the participation array $M(i,j,k,l)$ to the participation database, and the KPI engine outputs the key performance indices to the KPI database and displays one or more of the key performance indices and the participation array using the display device.

According to a further embodiment of the disclosure, the key performance indices include an expected number of participants $\mu(j)$ per event of type j, calculated as $$\mu(j) = \frac{1}{L}\sum_{l=1}^{L}\left\{\frac{1}{N(j)}\sum_{k=1}^{N(j)}\sum_{i=1}^{n}M(i,j,k,l)\right\},$$

where L is a total number of simulation runs, and a probability $\rho(j)$ of at least one event of type j having no more than $x(j)$ participants, calculated as $$\rho(j) = \frac{1}{L}\sum_{l=1}^{L}I\left[\sum_{k=1}^{N(j)}I\left\{\sum_{i=1}^{n}M(i,j,k,l) \leq x(j)\right\} > 0\right],$$

where L is a total number of simulation runs, I( ) denotes an indicator function where I(A)=1 if condition A is satisfied and I(A)=0 otherwise, and $x(j)$ is a participation threshold for event type j.

According to a further embodiment of the disclosure, the simulation engine calculates the participation array $M(i,j,k,l)$ by initializing an individual participation budget D to $B(i)$, the participation budget for the ith individual; selecting an event whose preference rank r is equal to a predetermined preference rank $R(i,j)$ for an event of type j for individual i, where individual i is qualified to participate in event j; sampling a random number Z from a binomial distribution Binom($N(j)$, $P(i,j)$), where Z represents a number of events in which to participate, when a number $N(j)$ of available events of type j is greater than 0 and when an expected participation rate $P(i, j)$ of individual i for events of type j is greater than 0; selecting a random subset S with Z elements from a set of integers $\{1, \ldots, N(j)\}$, where subset S is an indicator that shows which Z events to participate in; looping over k=1 to $N(j)$ and setting a participation array $M(i,j,k,l)$ to 1 if and only if k is contained in S, where participation array $M(i,j,k,l)$ is a binary indicator of whether or not individual i participates a k-th event of type j in an l-th run of simulation; and updating the individual participation budget as $D=D-Z \times C(j)$.

According to a further embodiment of the disclosure, the simulation engine calculates the predetermined preference rank $R(i,j)$ by receiving a pre-classified hierarchy of events of h levels for individual i where nodes in level u, $1 \leq u \leq h$, are indexed by $w_u=(v_1, \ldots, v_{u-1}, v_u)$, where $w_{u-1}=(v_1, \ldots, v_{u-1})$ is an index of a parent node and $v_u$ is the index of the child node ($v_u=1, \ldots, |w_{u-1}|$), where $|w_{u-1}|=$a number of children of node $w_{u-1}$, where each node is associated with a hierarchy score that indicates the rank of that node within a hierarchy of nodes at a same level with a common parent node; initializing all nodes of the hierarchy of events to be unvisited and all terminal nodes of the hierarchy of events to be unranked; and starting from a root of the hierarchy of events, visiting all child nodes of the root, where for each child node, the method includes finding a parent node of a plurality of most preferable unranked terminal nodes; assigning ranks to the most preferable unranked terminal nodes that are children of the parent node; determining the highest assigned rank; marking the parent node as visited; and finding a next unvisited node, where a vector of ranks of the terminal nodes is the preference rank $R(i,j)$ for events of type j for individual i.

According to an embodiment of the disclosure, there is provided a non-transitory program storage device readable by a computer, tangibly embodying a program of instructions executed by the computer to perform the method steps for simulating participation patterns in a plurality of events from a pool of qualified participants.

DETAILED DESCRIPTION OF EXEMPLARY EMBODIMENTS

Figure 1:
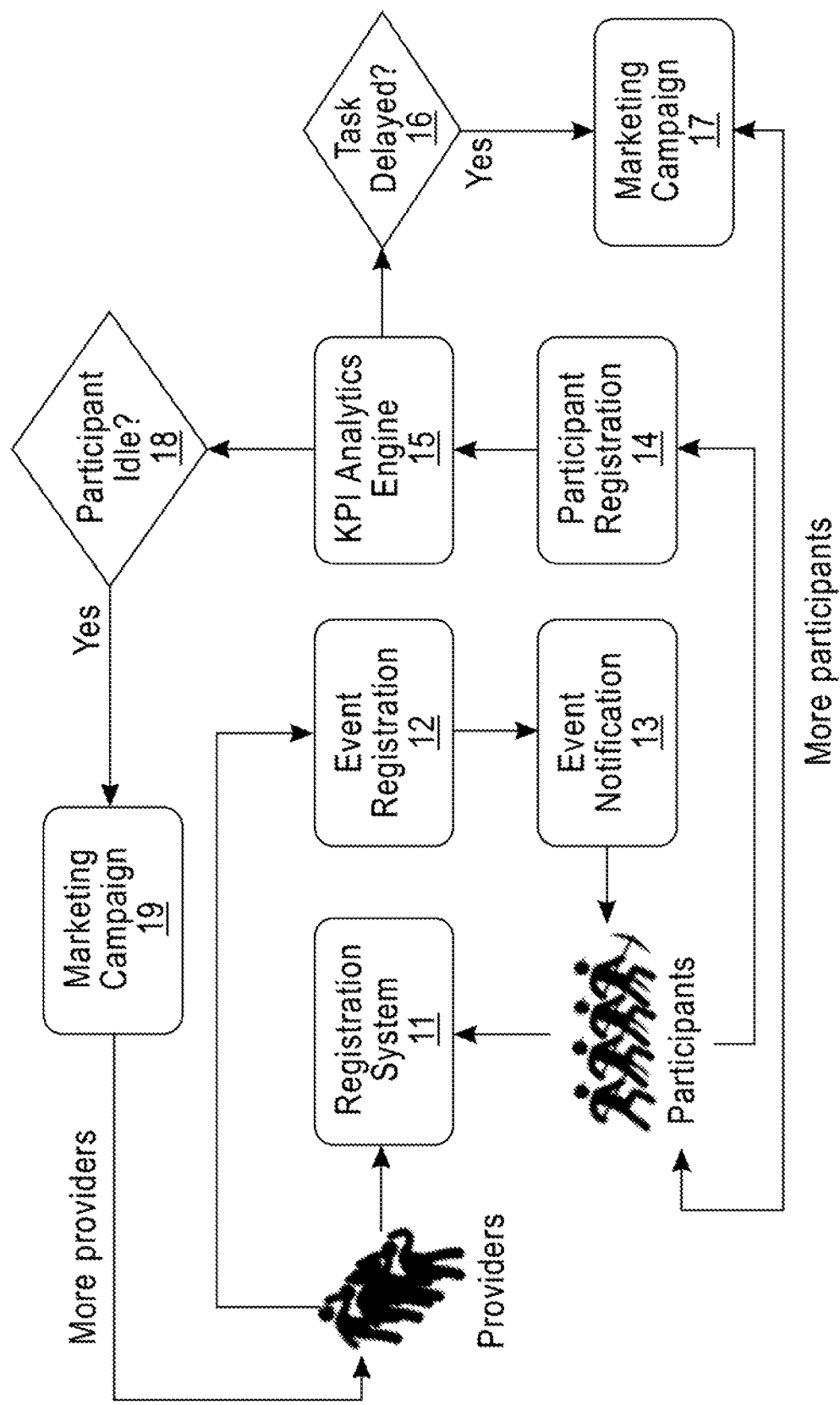
FIG. 1 is a block diagram of a system workflow according to an embodiment of the disclosure.

Exemplary embodiments of the disclosure as described herein generally provide systems and methods for simulating selective participation of multiple events from a pool of qualified participants. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the present disclosure provide a novel method of utilizing data-driven method and apparatus that simulates participation patterns from a pool of qualified participants by taking into account a number of key participation characteristics derived from historical event participation records: (1) Personalized qualifications; (2) Personalized participation rates; (3) Personalized preferences of event types; and (4) Personalized budget of participation. Further embodiments of the present disclosure can calculate key performance indexes (KPI's) for applications, such as the determination of (1) a minimum pool size based on the overall KPI; and (2) a minimum number of additional qualified members needed based on KPI of a given event type.

Furthermore, with different configuration, embodiments of the disclosure can be incorporated into other applications with voluntary but selective participation. Such applications include, but are not limited to: (a) tourism, by defining a process of attracting, accommodating, and entertaining tourists, and operating tours, and (b) a voluntary resource sharing operation, in which a pool of volunteers have registered to offer their resources, such as automobiles, apartments, etc., to serve requests from clients on a voluntary case-by-case basis.

FIG. 1 depicts an architecture of a core use case according to an embodiment, that of a crowdsourcing platform where there are participants who have skills that can satisfy work requests of the providers. Different work requests have different durations, payments/awards, and require different skills. Considering a finite set of skills and pre-defined duration and payment/award options, work requests may have some degree of overlap with other work requests in the crowdsourcing system. Depending on the nature of work at any given time, there may be a need to promote work requests or recruit additional participants to join the pool of candidates. Embodiments of the disclosure can provide a prediction mechanism to facilitate this understanding to ensure that supply and demand is being met within the crowdsourcing platform.

Referring now to the figure, a platform according to an embodiment contains an electronic registration system 11, such as a website and/or a mobile app, which permits the providers of work requests to indicate the requirements of work that needs to be performed. A provider inputs the work description and detailed requirements and acceptance criteria of the assignment, the skills required to complete the assignment, and the amount of payment that is being offered, scaled based on expected job duration and complexity. Multiple providers can enter multiple work requests in a many-to-many fashion. Work is continuously fed into a registration system. The characteristics of work in a platform according to an embodiment are a key input into the supply/demand equation. According to embodiments of the disclosure, all past work is profiled against all past interest in similar work. Through analytics associated with the work characteristics combined with participant characteristics and registration patterns for similar work, a KPI analytics engine 15 according to an embodiment can make a prediction.

A work request has a start and end date. The request starts an event registration phase 12 which opens the work for "bid" where participants can apply if they feel they have the capability to complete the assignment. This is the formal process of presenting a work request and asking for talent to apply.

A platform according to an embodiment provides an event notification 13 to open work requests which are in registration and also notifies potentially qualified participants to consider the work.

A participant can register at 14 to participate and provides his/her qualifications, approach, and bid for the assignment. Other participants may also do the same, generating competition for the work. Some work may fail to attract participants.

A KPI analytics engine 15 according to an embodiment analyzes all work requests (demand) against all bids for the work (supply). According to embodiments of the disclosure, all past work is profiled against all past interest in similar work. Through analytics associated with the work characteristics combined with participant characteristics and registration patterns for similar work, a KPI analytics engine 15 according to an embodiment can perform predictions. A KPI analytics engine can predict if supply will meet work demand or if there is an over or under capacity of work demand in comparison to the supply.

In situations where work demand was not met with supply, work requests are delayed 16 and do not get completed.

Additional marketing 17 of the type of work that is being delayed is required to bring in new supply. This advertising to potential additional worker talent is used to recruit new participants with the required skills to join the crowdsourcing platform. Insights from the KPI analytics engine 15 according to an embodiment and the delayed tasks 16 result in a recommendation for campaigns in step 17. These recommendations help to ensure that demand is being met as frequently as possible, which is useful in running a crowdsourcing platform.

If the number of participants who register and bid for work requests is large, then supply is outstripping demand and can cause participants to lose interest in participating in future work 18 because competition is too strong. Across all of the work requests in the platform, if a significant numbers of participants are not being awarded with work, then some of the participants (supply) become disenfranchised and may drop out of the platform.

In an over-supply situation, marketing and advertising is performed 19 for the providers to attempt to generate additional demand. Incentives may be used to drive more work into the system.

Methods according to embodiments of the disclosure make use of the following universal parameters. Methods according to embodiments assume that there is a pool of qualified participants that includes n individuals, and that events are pre-classified into m types. According to embodiments, universal parameters include:

N(j) is the number of events of type j available for participation in a given period of time (j=1, . . . , m), and C(j) is the cost of each event of type j to each participant, such as money to pay for participation, time to spend on the event.

In addition, methods according to embodiments of the disclosure make use of personalized participation characteristics learned from historical data, referred to hereinbelow as personalized parameters:

Q(i, j) is the binary qualification indicator of individual i for events of type j, where 1=qualified, and 0=not qualified;

P(i,j) is the expected participation rate of individual i for events of type j, where i=1, . . . , n; j=1, . . . , m, which is a real number between 0 and 1, where rate 0=never participate or not qualified, and rate 1=always participate;

B(i) is the participation budget of individual i, i=1, . . . , n, such as a total allowance, a total available time, etc.; and R(i, j) is the preference rank of events of type j for individual i, and {R(i,1), . . . , R(i,m)} is a permutation of integers {1, . . . , m}, where rank 1=most preferred event type, rank m=least preferred event type.

An outcome according to an embodiment of the disclosure includes:

a participation array M(i,j,k,l) that is a binary (0-1) indicator of whether or not individual i participates the k-th event of type j in the l-th simulation run, l=1, . . . , L for some large L; and one or more key performance indices (KPI) that are summary statistics derived from the participation array. Examples of a KPI for capacity management and planning of the pool include an expected number of participants per event of type j, and the probability of at least one event of type j that has no more than x participants.

Examples of applications according to embodiments of the disclosure include the determination of the minimum pool size based on an overall KPI, and the determination of the minimum number of additional qualified members needed based on the KPI of a given event type.

Figure 2:
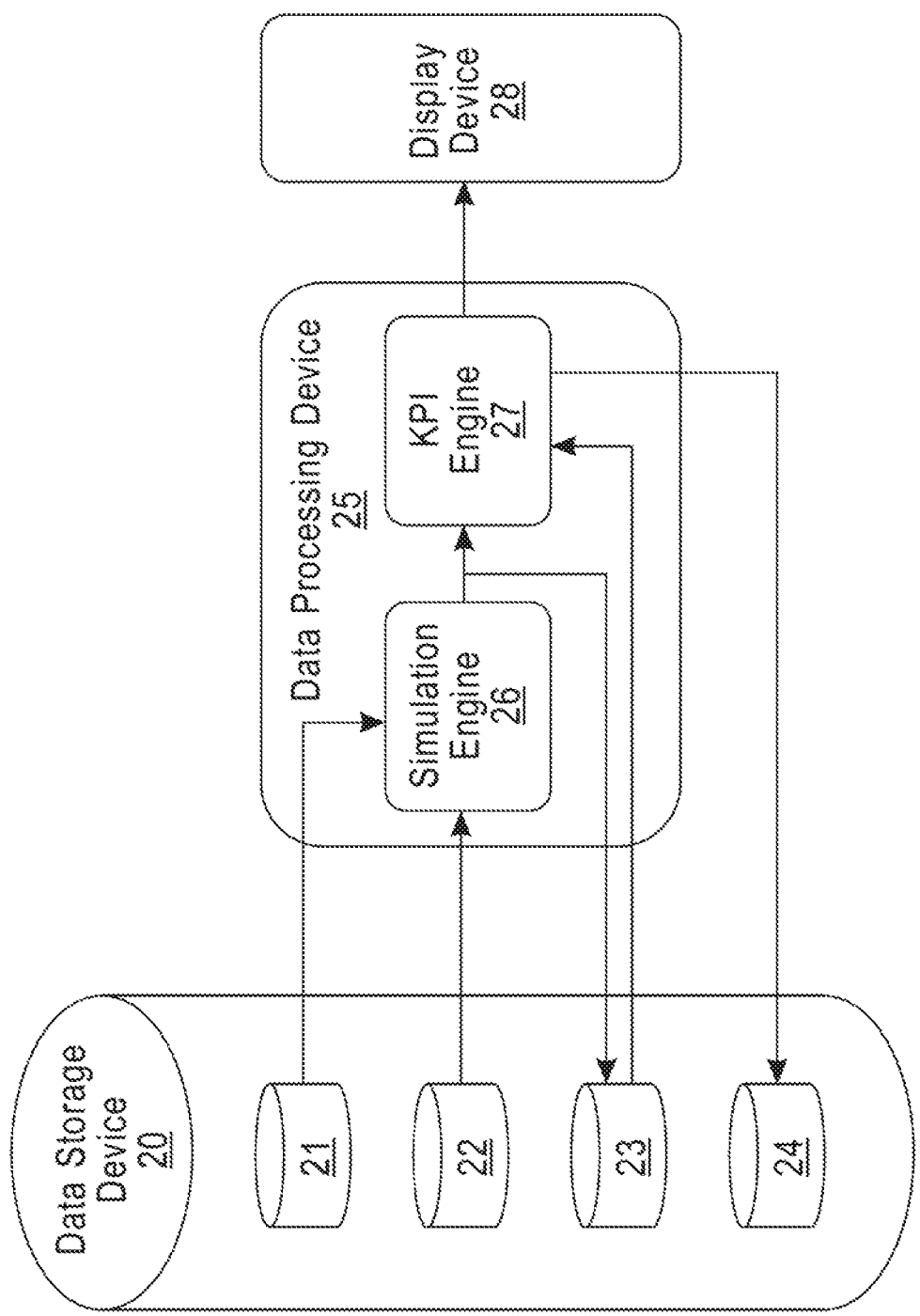
FIG. 2 is schematic diagram of a system architecture, according to an embodiment of the disclosure.

FIG. 2 is schematic diagram of a system architecture, according to an embodiment of the disclosure. Referring now to the figure, a system according to an embodiment includes a data storage device 20, a data processing device 25, and a display device 28. The data storage device 20 includes a plurality of databases. These databases include, but are not limited to, an event database 21 that stores a classification scheme for the events that classifies the various types of events and the universal parameters, including the number of events N(j) of type j and the cost C(j) of each event of type j, a personal database 22 that stores identifications of all members of the pool of qualified participants and the personalized parameters, including the binary qualification indicator Q(i,j), the expected participation rate P(i,j), the participation budget B(i), and the preference rank R(i,j), a participation database 23 that stores the participation array M(i,j,k,l) and a participation thresholds x(i) for each event, where i=1 to m, and a KPI database 24 that stores the key performance indices. Although FIG. 2 shows the event database 21, the personal database 22, the participation database 23, and the KPI database 24 as included in a single data storage device 20, embodiments are not limited thereto, and in some embodiments, each of these databases may be stored in its own database, and other embodiments, various combinations of these databases may be stored in different storage devices. The data processing device 25 includes a simulation engine 26 and a KPI engine. A simulation engine 26 according to an embodiment calculates the participation array M(i,j,k,l) using the universal parameters stored in the event database 21 and the personalized parameters stored in the personal database 22, and outputs the participation array M(i,j,k,l) to the participation database 23. A KPI engine 27 calculates the key performance indices using participation data stored in the participation database 23 and outputs the key performance indices to the KPI database 24, and displays one or more of the resulting indices and participation array using the display device 28. Although FIG. 2 shows the simulation engine 26 and the KPI engine 27 as included in a single data processing device 25, embodiments are not limited thereto, and each of these engines may be implemented in its own processing device, and in other embodiments, each of these engines can be implemented in a distributed computing scenario in which computation is distributed over multiple processing devices.

Figure 3:
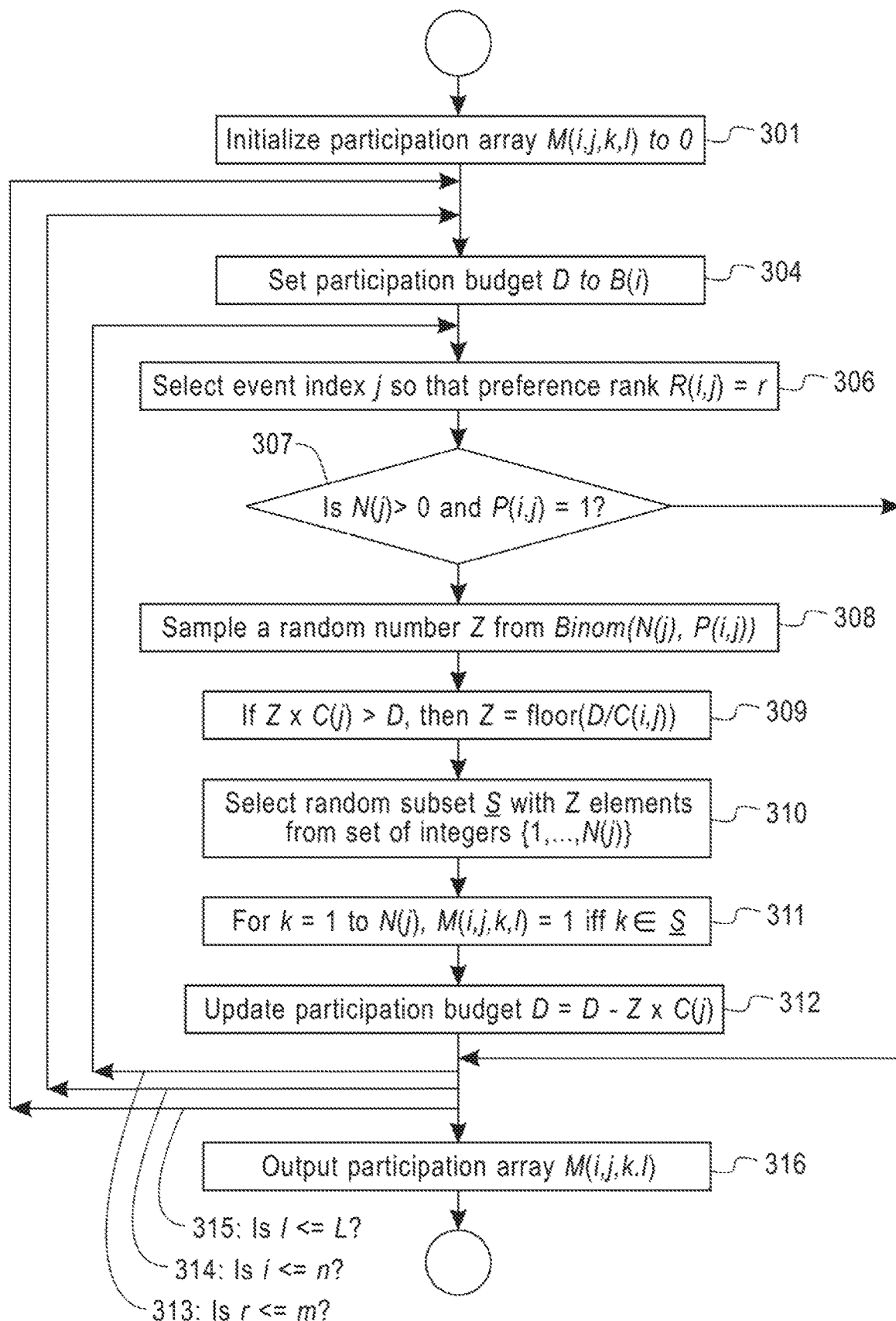
FIG. 3 is a flowchart of the simulation engine of FIG. 2, according to an embodiment of the disclosure.

A participation simulation according to an embodiment of the disclosure is as follows, with reference to the flowchart of FIG. 3. Referring now to the flowchart, a participation simulation begins at step 301 by initializing the participation array M(i,j,k,l) to 0 for all i,j,k,l. Then, two nested loops begin: an outer loop over simulation runs l for l=1 to L, and an inner loop over individuals i for i=1 to n. At step 304, variable D is set to B(i), the participation budget for the ith individual. The participation budget B(i) can be obtained from the personal database 21 of the data storage device 20 shown in FIG. 2. Then a loop over event preference rankings r begins for r=1 to m. At step 306, event index j is selected so that the preference rank R(i,j)=r, the current event preference index, and so that the binary qualification indicator Q(i,j)=1. Both the preference rank R(i,j) and the binary qualification indicator Q(i,j) can be obtained from the personal database 21 of the data storage device 20 shown in FIG. 2. At step 307, it is determined whether the number N(j) of available events of type j is greater than 0 and whether the expected participation rate P(i,j) of individual i for events of type j is greater than 0. The expected participation rate P(i,j) can be obtained from the personal database 21 of the data storage device 20 shown in FIG. 2, and the number N(j) of available events can be obtained from the event database 22 of the data storage device 20 shown in FIG. 2. If the two conditions are true, the method continues at step 308 by sampling a random number Z from a binomial distribution Binom(N(j), P(i,j)). This number Z represents the number of events in which to participate. At step 309, if Z×C(j)>D, where C(j) is the cost of event j, then Z is set to the largest integer which is less than or equal to D/C(j), the budget constraint imposed on the number of events to participate. The cost C(j) of event j can be obtained from the event database 22 of the data storage device 20 shown in FIG. 2. Then, at step 310, a random subset S with Z elements is selected from the set of integers {1, . . . , N(j)}. Subset S is an indicator that shows which Z events to participate in. Step 311 is a loop over an event participation indicator k=1 to N(j), in which M(i,j,k,l) is set to 1 if and only if k is contained in S. At step 312, the participation budget D is updated as D=D−Z×C(j). The loop over event preferences continues from step 313, the loop over individuals continues from step 314, and the outer loop over simulation runs continues from step 315. After termination of the loops, the participation array M(i,j,k,l) is output at step 316 to the participation database 23 of the data storage device 20 shown in FIG. 2. It is to be understood that the order of steps and the nesting of the loops in the flowchart of FIG. 3 are exemplary and non-limiting, and that steps can be performed in a different order in other embodiments, and the hierarchy of loops can also be altered in other embodiments of the disclosure.

A simulation can help answer business questions in the form of quantitative values of certain business KPIs. Examples of important KPIs required in the simulation method are:

1. The expected number of participants per event of type j:

$$\mu(j) = \frac{1}{L}\sum_{l=1}^{L}\left\{\frac{1}{N(j)}\sum_{k=1}^{N(j)}\sum_{i=1}^{n}M(i,j,k,l)\right\}; \quad (1)$$

2. The probability of at least one event of type j having no more than x(j) participants:

$$\rho(j) = \frac{1}{L}\sum_{l=1}^{L}I\left[\sum_{k=1}^{N(j)}I\left\{\sum_{i=1}^{n}M(i,j,k,l) \le x(j)\right\} > 0\right], \quad (2)$$

where I( ) denotes the indicator function in which I(A)=1 if the condition A is satisfied and I(A)=0 otherwise, and x(j) is a participation threshold for event type j; and 3. A special case of example 2 is the probability of at least one event of type j that has no participation:

$$\rho(j) = \frac{1}{L}\sum_{l=1}^{L}I\left[\sum_{k=1}^{N(j)}I\left\{\sum_{i=1}^{n}M(i,j,k,l) = 0\right\} > 0\right], \quad (3)$$

where x(j) in EQ. (2) has been set to zero.

Figure 4:
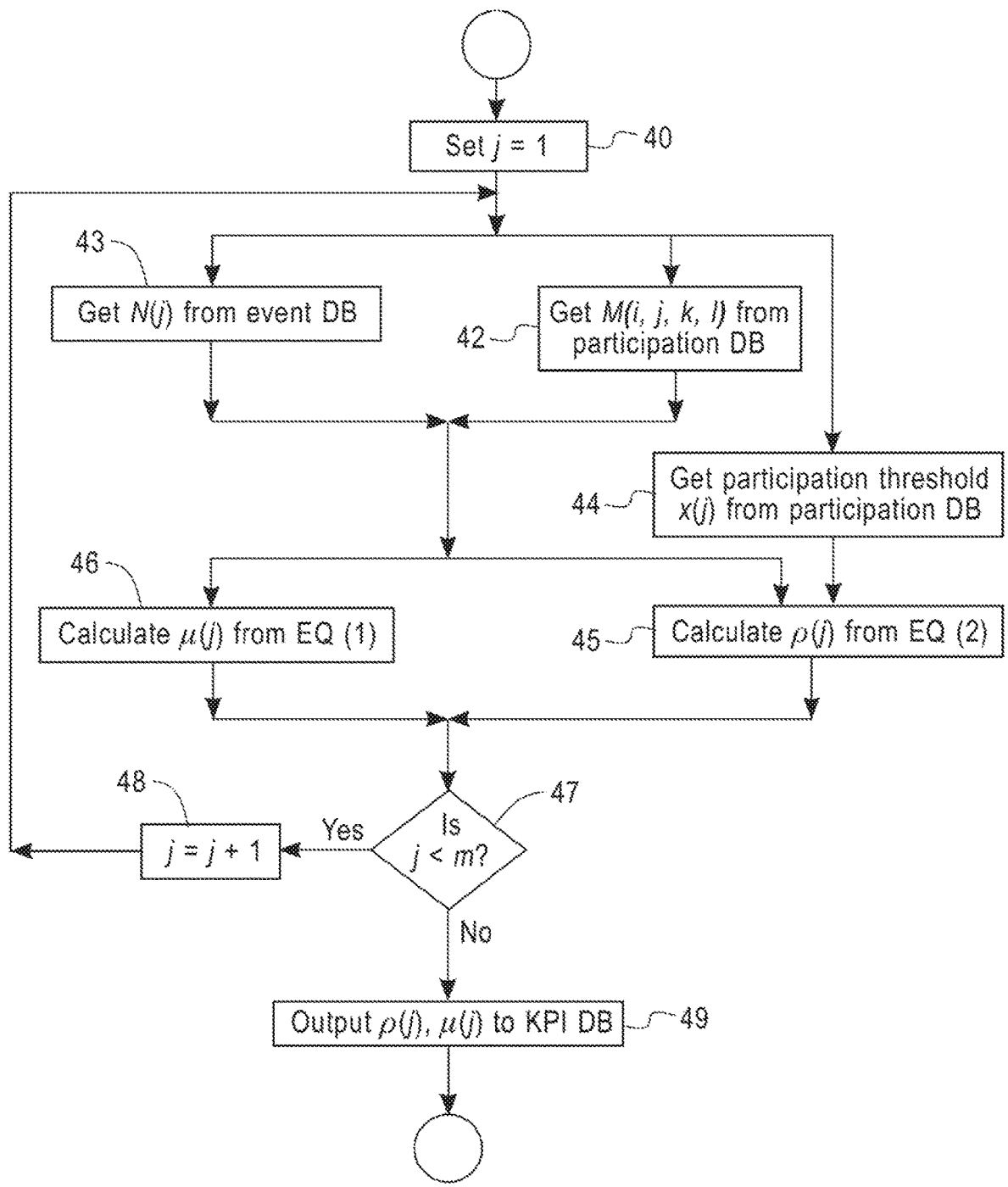
FIG. 4 is a flowchart of the KPI engine of FIG. 2, according to an embodiment of the disclosure.

FIG. 4 is a flowchart of a process according to an embodiment of KPI engine 27 for calculating μ(j) and ρ(j). Referring now to the figure, a process begins by initializing an event type index j to 1, at step 40. The event type index is used to retrieve, at step 42, participation array M(i, j, k, l) from the participation database 23 of FIG. 2, and to retrieve, at step 43, the number of events of type j events N(j) from the event database 21 of FIG. 2. The event type index j is also used to retrieve a participation threshold x(j) from the participation database 23 of FIG. 2, at step 44. Note that steps 42, 43, and 44 can be performed substantially concurrently. Then, at step 45, the probability of at least one event of type j having no more than x(j) participants, ρ(j), is calculated from the participation array M(i, j, k, l), the number of events of type j events N(j), and the a participation threshold x(j) using EQ. (2), and at step 46, the expected number of participants per event of type j, μ(j), is calculated from the participation array M(i, j, k, l) and the number of events of type j events N(j) using EQ. (1). Note that steps 45 and 46 can be performed substantially concurrently. At step 47, j is compared to m, the number of types of events, and if j<m, j is incremented at step 48, and steps 42 to 47 are repeated. If j=m at step 47, the probabilities of at least one event of type j having no more than x(j) participants, ρ(j, x), and the expected number of participants per event of type j, μ(j), are output to the KPI database 24 of FIG. 2 at step 49.

According to embodiments, additional business metrics can be calculated from the simulation results.

One application according to an embodiment is determining a minimum pool size based on an overall KPI. According to embodiments, let P*(j) be the average participation rate for events of type j for members in the existing pool, where j=1, . . . , m, let R*(j) be the rank of a type j event in the most common preferences of members in the existing pool, let B* be the average budget of members in the existing pool, and let $r_0$ be the overall risk metric of the existing pool. For example, $r_0$=max{ρ(1), . . . , ρ(m)}, i.e., the largest probability of no more than given numbers of participants over all event types.

According to an embodiment, let $r_{min}$ be the risk tolerance level, and initialize r=$r_0$ and n*=n. An algorithm according to an embodiment for determining a minimum pool size is as follows.

---

While r < $r_{min}$
    Set n* = n* + 1;
    Simulate participation based on information about n members in the existing pool and n* − n hypothesized new members with P*(j), R*(j), and B* as personalized participation characteristics;
    Compute an overall risk metric r based on the simulation result;
End While

---

For example, the overall risk metric r can be the largest probability of no more than the given numbers of participants over all event types. According to an embodiment, the minimum pool size is n*, where there are n existing members and n*−n additional members, if n*>n.

Another application according to an embodiment is determining a minimum number of additional qualified members needed based on a KPI of a given event type. According to an embodiment, let j be the event type of interest, let P(j) be the average participation rate for events of type j for qualified members in the existing pool, i.e., for which Q(i)=1, let R(j) be the rank of type j events in the most common preference of the qualified members in the existing pool, let B be the average budget of qualified participants in the existing pool, and let r(j) be the risk metric (KPI) for the given event. For example, r(j)=ρ(j) is the probability of no more than x(j) participants for event of type j. Let $r_{min}$ be the risk tolerance level, and initialize r=r(j) and n=n. An algorithm according to an embodiment for determining a minimum number of additional qualified members needed is as follows.

---

While r < $r_{min}$
    Set n = n + 1;
    Simulate participation based on information about n existing members and n − n hypothesized new qualified members with P(j), R(j), and B as their personalized participation characteristics;
    Compute the risk metric r for the given event based on the simulation result;
End While

---

For example, the risk metric r can be max{ρ(1), . . . , ρ(m)}. According to an embodiment, the minimum number of additional members that qualify for type j events is n**−n.

In addition to the above disclosed applications, embodiments of the disclosure can be extended to include an event hierarchy structure. A hierarchy structure can provide an improved model for defining benefits for participating in events.

Figure 5:
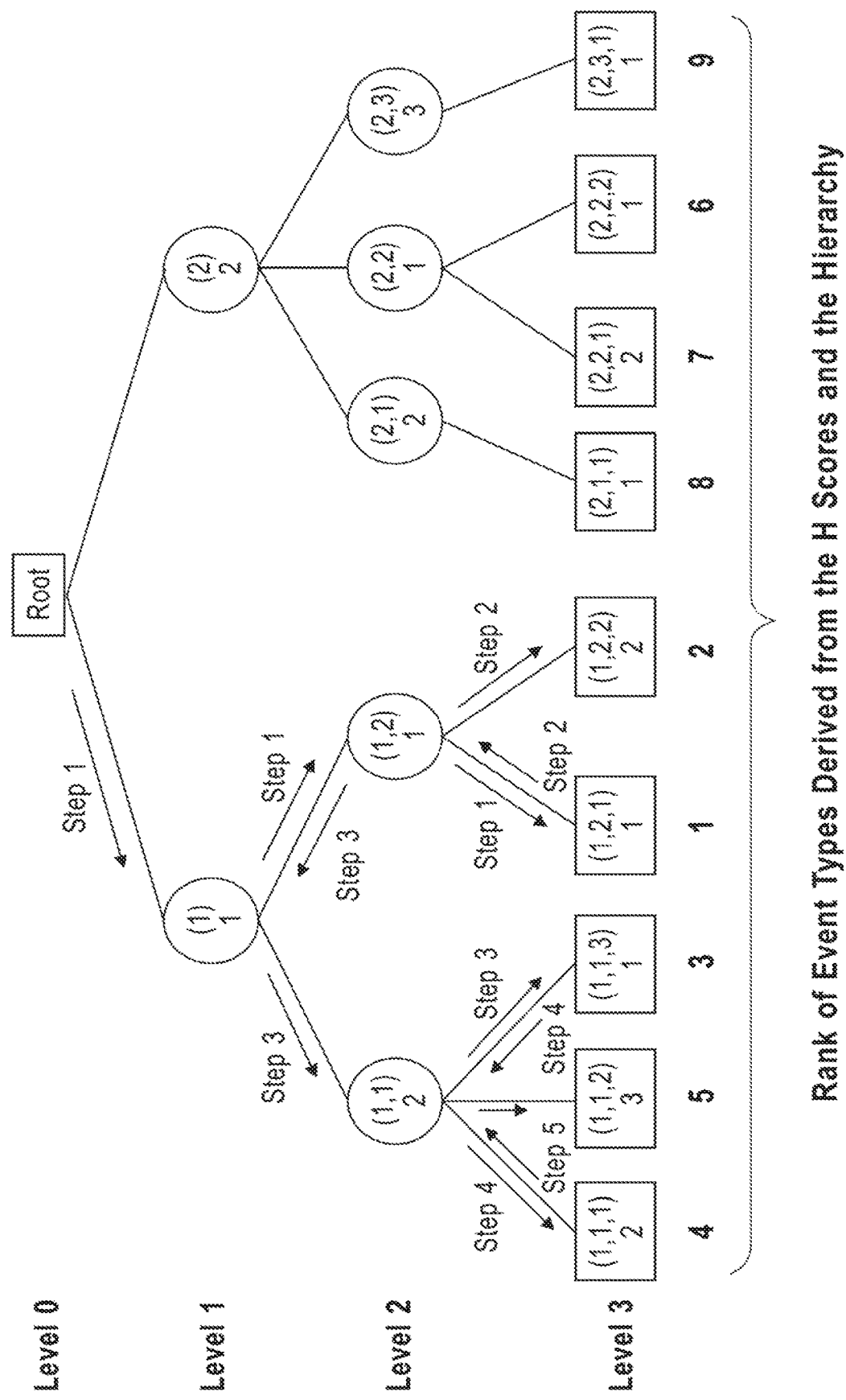
FIG. 5 illustrates a hierarchical preference and event type ordering for the case of h=3, according to an embodiment of the disclosure.

According to an embodiment, an example of hierarchical preference is as follows. FIG. 5 depicts a tree that illustrates hierarchical preference and event type ordering, with three hierarchy levels, according to embodiments of the disclosure. According to embodiments, there is a pool of qualified participants that includes n individuals, events are pre-classified according to an h-level hierarchy where the nodes in level u, where u=1, . . . , h, are indexed by $w_u = (v_1, \ldots, v_{u-1}, v_u)$ with $w_{u-1} = (v_1, \ldots, v_{u-1})$ being the index of the parent node and $v_u$ being the index of the child node ($v_u = 1, \ldots, |w_{u-1}|$), where $|w_{u-1}|$=number of children of node $w_{u-1}$. According to embodiments, data includes N(j), the number of events of type $j=(j_1, \ldots, j_h)$ available for participation in a given period of time; C(j), the cost of each event of type $j=(j_1, \ldots, j_h)$ to participants; P(i,j), the expected participation rate of individual i for events of type $j=(j_1, \ldots, j_h)$, where i=1, . . . , n, a real number between 0 and 1, where rate 0=never participate and rate 1=always participate; B(i), the total participation budget of individual i, where i=1, . . . , n; $H(i, w_{u-1}, v)$, the hierarchical preference rank of individual i for the children of node $w_{u-1}$, where v=1, . . . , $|w_{u-1}|$, and rank 1=most preferred, rank $|w_{u-1}|$=least preferred).

An outcome according to embodiments includes the participation array M(i,j,k,l), a binary (0-1) indicator of whether or not individual i participates the k-th event of type $j=(j_1, \ldots, j_h)$ from the l-th run of simulation, where l=1, . . . , L for some large L; and a key performance index (KPI), which is a summary statistic derived from the participation array.

A participation simulation algorithm is substantially similar to that presented in FIG. 3, except that the preference rank R(i,j) of event type $j=(j_1, \ldots, j_h)$, i.e. the R score, is uniquely determined from the H scores using an algorithm described and illustrated by FIG. 5.

An algorithm for determining the preference rank R(i,j) of event type $j=(j_1, \ldots, j_h)$ using a preference tree of FIG. 5 according to embodiments is as follows. In each node of the tree below the root node, the number in parentheses is the index of the node in the hierarchy, and the number below is the H score of the node.

Starting from the root node of the preference tree, go down the tree along the path, labeled as step 1, of the most preferred node, i.e. the child node with the lowest H score in the figure, until arriving at the last level of the tree, i.e., a terminal node, and mark the final node in this path with a preference rank 1, the R score of the event type represented by this node. In the figure, this path includes nodes (1), (1, 2), and (1, 2, 1).

Next, starting from the terminal node found in the previous step, go up to its parent and then go down to the next most preferred terminal node of its children, a path labeled as step 2, and mark this node with preference rank 2. Repeat this process until all siblings of the node with preference rank 1 are marked with a rank. In the figure, since node (1, 2, 1) has only one sibling, the step 2 path includes nodes (1, 2) and (1, 2, 2).

Next, starting from the terminal node found the previous step, trace back one level at a time until arriving at a node that contains unmarked children. This is node (1) in the figure. From this node, go down through the path, labeled at step 3, with the most preferred and unmarked nodes until reaching the last level of the tree, and mark the terminal node in this path by its rank. In the figure, the step 3 path includes nodes (1), (1, 1), and (1, 1, 3). This process is repeated until all nodes in the terminal level of the tree are marked with ranks.

Figure 6:
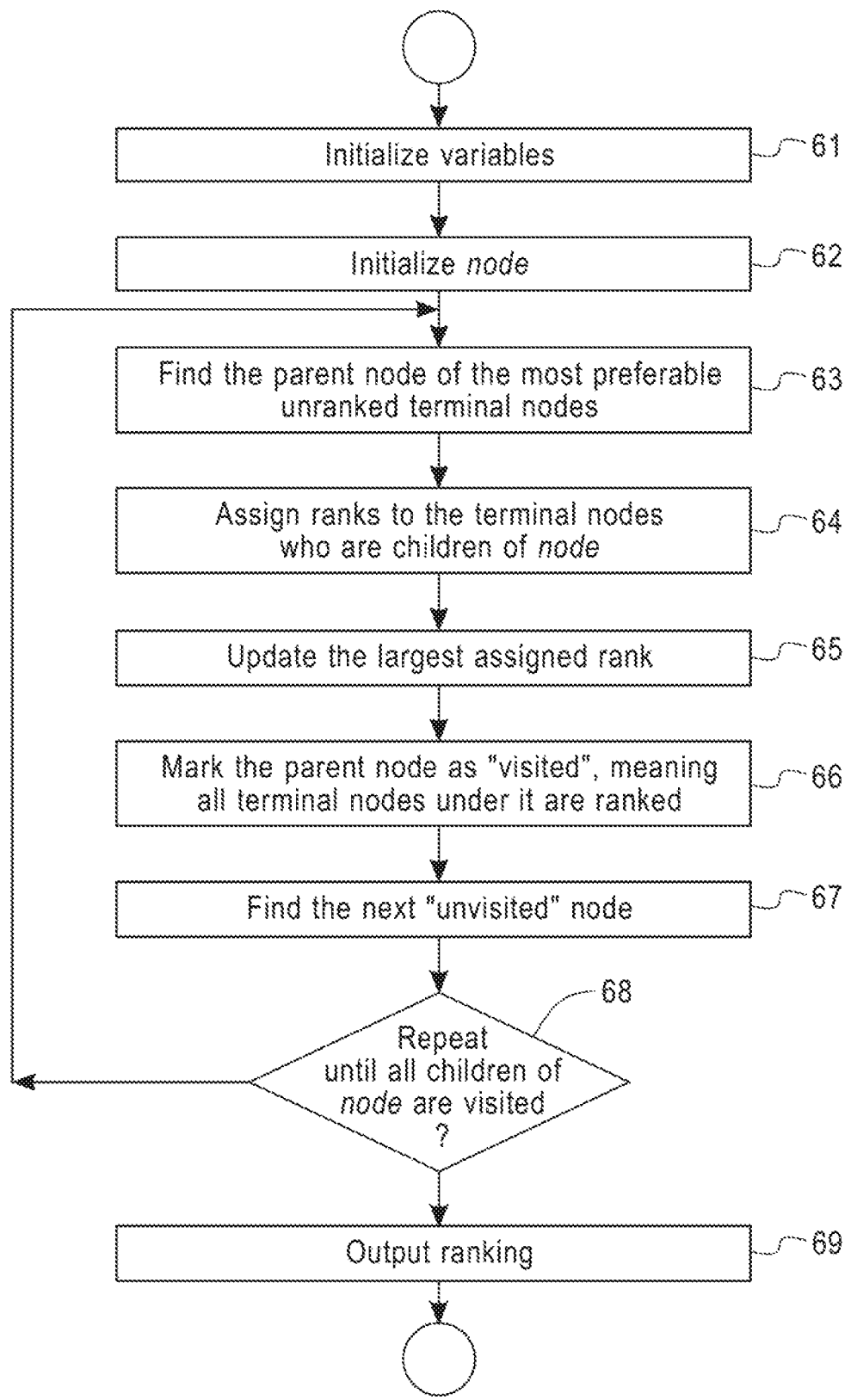
FIG. 6 is a flowchart of a hierarchical preference algorithm, according to an embodiment of the disclosure.

Pseudo code for an event type ordering based on a preference tree with an arbitrary number of levels is as follows, with reference to the steps of FIG. 6, a flowchart of an algorithm for event type ordering based on a preference tree with an arbitrary number of levels.

```
Input: a preference tree.
(Initializations: step 61)
status(node) := "unvisited" for each node of the tree
rank = zero vector whose length is equal to the number of terminal
nodes of the tree
rank.max := 0
Let node := root of the tree (step 62)
(Notation:
    children(node)[k] denotes the kth "unvisited" child of node,
    size(node) denotes the number of "unvisited" children of node,
    H(children(node)[k]) denotes the H score of the kth "unvisited"
child of node.)
While not all children of node are "visited",
(Find the parent node of the most preferable unranked terminal nodes:
step 63)
    While node is not a parent of any terminal nodes,
        Let k₀ be such that H(children(node)[k₀]) =
          min{H(children(node)[1]),...,H(children(node)[size(node)])}
        Let node = children(node)[k₀]
    End of Loop.
    (Assign ranks to the terminal nodes who are children of node:
step 64)
    For k = 1 to size(node), do
        Let i = index of children(node)[k] in the vector rank
        Let rank[i] := rank.max + rank of H(children(node)[k])
        among
            {H(children(node)[1]),...,H(children(node)[size(node)])}
    End of Loop.
    (Update the largest assigned rank: step 65)
    Let rank.max := max(rank)
    (Mark the parent node as "visited", meaning all terminal nodes
under it are ranked: step 66)
    Let status(node) = "visited"
    (Find the next "unvisited" node: step 67)
    While status(node) = "visited" and node is not root,
        Let node = parent(node)
        If all children of node are "visited", let status(node) =
"visited"
    End Loop
End of Loop (Step 68)
Output: rank contains the ranking of all terminal nodes (event types)
(step 69)
```

Business applications of embodiments of the disclosure include, but are not limited to, crowdsourcing services, conference planning, voluntary resource sharing services, and tour planning.

In a crowdsourced software development operation, clients post requests for short-cycled software development work with technical specifications and schedules on the service provider's web portal as crowdsourced events. Resource pool members can select any posted event in which to participate. Clients choose winner(s) from the participants to award the work. The service provider needs to manage the resource pool properly so that each event will be adequately participated.

Embodiments of the disclosure can simulate the participation patterns of a predicted and/or anticipated set of requests from the resource pool members based on their skills, availability, and historical participation records. A process according to an embodiment includes, but is not limited to:

Mapping the requests to predefined event types;

Extracting required parameters from historical records of events and participation;

Computing the probability of having enough participants for each event type; and if the probability for some event types is too low, computing the number of additional skills needed to ensure a sufficiently high probability.

Conference planners frequently need to be able to reserve facilities to accommodate the anticipated attendance of a repeating conference, such as annual meetings of a professional organization, which typically includes the need to reserve suitable conference venues to accommodate parallel sessions with uncertain participation.

Embodiments of the disclosure can simulate the participation patterns of scheduled parallel sessions from the pool of conference registrants based on their availability, historical participation records and other characteristics. A process according to an embodiment includes, but is not limited to:

Mapping the conference sessions to predefined event types;

Extracting required parameters from historical records of conferences and participation;

Computing the probability distribution of the number of attendees for each session; and Computing the minimum capacity of each session based on the probability distribution, i.e., the smallest number such that the probability of the number of attendees exceeding it is sufficiently small.

To provide an indicator of anticipated participation of a given request in a voluntary resource sharing operation, embodiments of the disclosure can manage a pool of volunteers who have registered to offer their resources, such as automobiles, apartments, etc., to serve requests from clients on a voluntary case-by-case basis. A resource sharing service provider notifies volunteers when a request arrives; who can freely decide whether or not to offer their service to the request based on their preferences and the characteristics of the request, such as timing, pricing, etc. The client selects one or more winners from the participants to deliver the service. The resource sharing service provider wants to have an indicator of anticipated participation for a given request to facilitate the planning of service requests by the client, such as planning a trip in the future that requires the service of volunteers.

Embodiments of the disclosure can simulate the participation pattern of a hypothetical request from the pool of volunteers based on their historical participation records. A process according to an embodiment includes, but is not limited to:

Mapping the request to a predefined event type;

Extracting required parameters from historical records of requests and participations; and Computing a probability distribution of the number of participants from the pool of volunteers for the given request.

Tour Planning involves organizing tours with different options for a group of customers. A tour organizer needs to arrange in advance for transportation, lodging, and other services for a group of customers to accommodate their eventual choices of different options, i.e., tour packages, before the choices are available or finalized.

Embodiments of the disclosure can simulate the participation patterns of different options from the group of customers based on historical records of participation to facilitate the advanced booking of resources needed. A process according to an embodiment includes, but is not limited to:

Mapping the options to predefined event types;

Extracting parameters from historical records of tours and participations;

Computing the probability distribution of the number of participants for each option from the group of customers; and Computing the necessary amount of resources to accommodate the participants.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
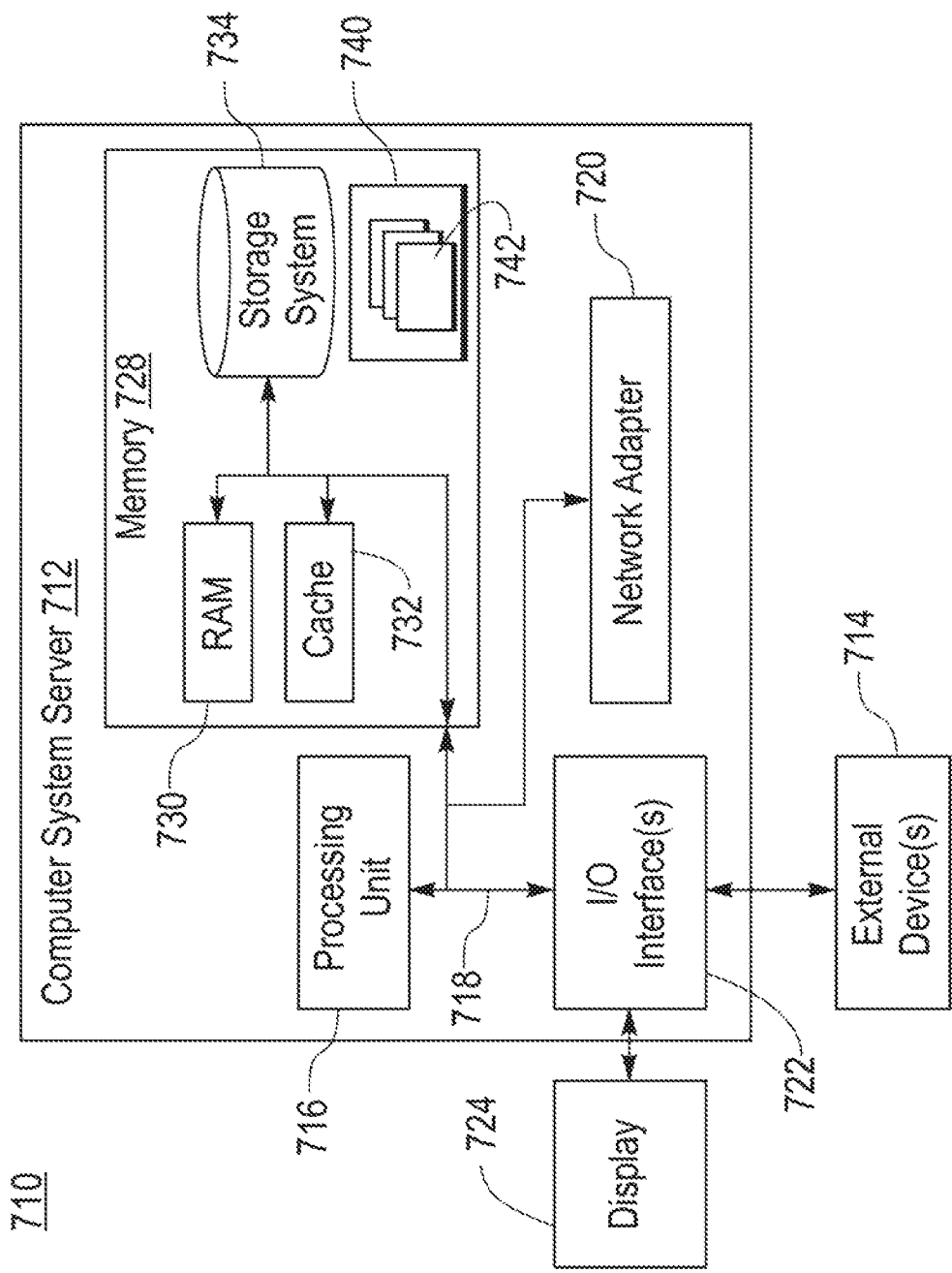
FIG. 7 is a schematic of an exemplary cloud computing node that implements an embodiment of the disclosure.

Referring now to FIG. 7, a schematic of an example of a cloud computing node is shown. Cloud computing node 710 is only one example of a suitable cloud computing node and is not intended to suggest any limitation as to the scope of use or functionality of embodiments of the disclosure described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the disclosure.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the disclosure as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
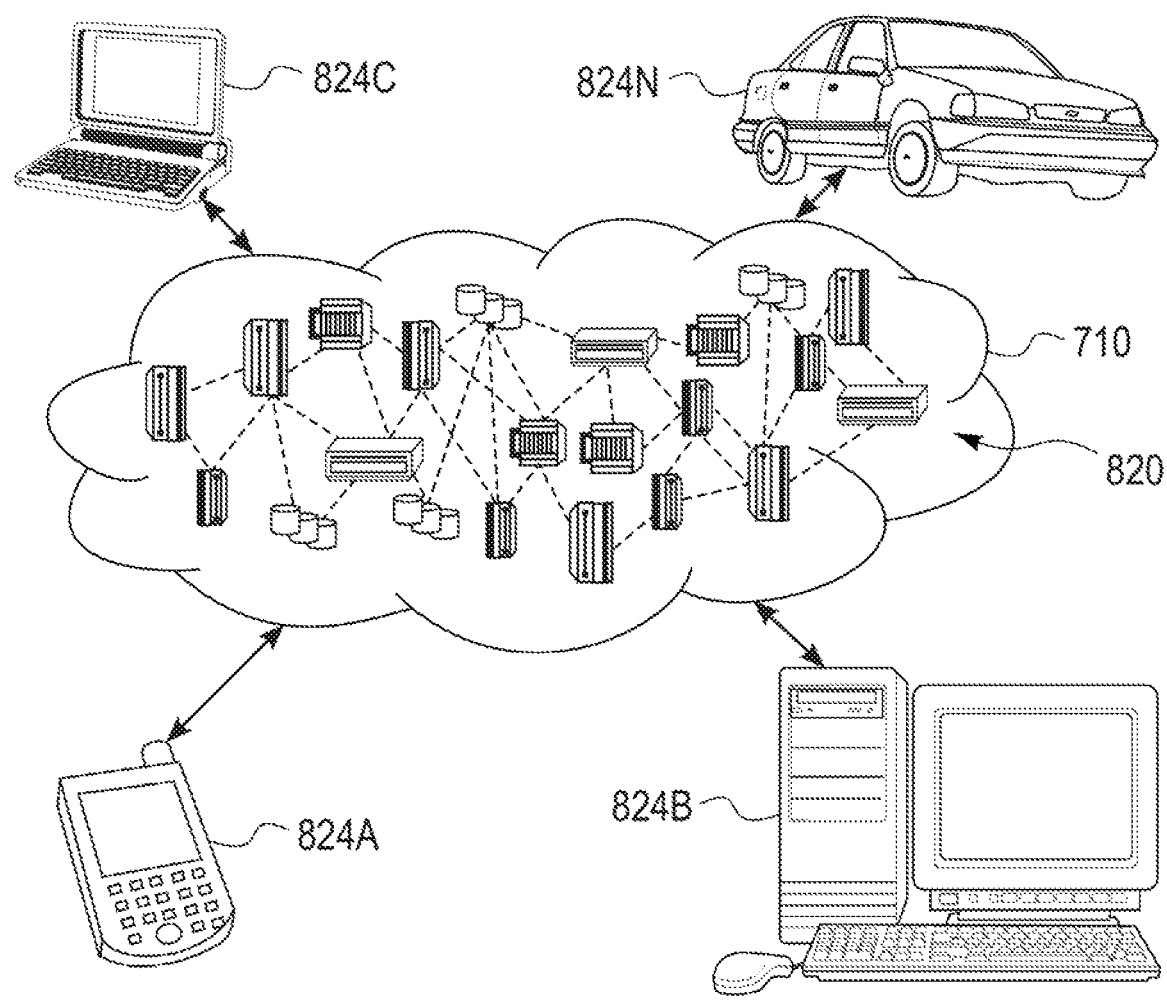
FIG. 8 shows an exemplary cloud computing environment according to embodiments of the disclosure.

Referring now to FIG. 8, illustrative cloud computing environment 820 is depicted. As shown, cloud computing environment 820 comprises one or more cloud computing nodes 710 with which local computing devices used by cloud consumers, such as, for example, personal digital assistant (PDA) or cellular telephone 824A, desktop computer 824B, laptop computer 824C, and/or automobile computer system 824N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 820 to offer infrastructure, platforms and/or software as services for which a cloud consumer does not need to maintain resources on a local computing device. It is understood that the types of computing devices 824A-N shown in FIG. 8 are intended to be illustrative only and that computing nodes 710 and cloud computing environment 820 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method for predicting participation patterns in a plurality of events from a pool of qualified participants, comprising the steps of:
    selecting an event whose preference rank r is equal to a predetermined preference rank R(i,j) for an event of type j for individual i, wherein individual i is qualified to participate in event j;
    sampling a random number Z from a binomial distribution Binom(N(j), P(i,j)), wherein Z represents a number of events in which to participate, when a number N(j) of available events of type j is greater than 0 and when an expected participation rate P(i, j) of individual i for events of type j is greater than 0;
    selecting a random subset S with Z elements from a set of integers {1, ..., N(j)}, wherein subset S is an indicator that shows which Z events to participate in;
    performing a simulation of the participation patterns in the plurality of events by looping over k=1 to N(j) and setting a participation array M(i,j,k,l) to 1 if and only if k is contained in S, wherein the participation array M(i,j,k,l) is a binary indicator of whether or not individual i participates a k-th event of type j in an l-th run of the simulation;
    using said participation array M(i,j,k,l) to calculate an expected number of participants μ(j) per event of type j, and to calculate a probability ρ(j) of at least one event of type j having no more than x(j) participants;
    generating and selecting new additional participants via directed marketing and advertising, wherein a risk of low participation of an event of type j is kept from falling below a risk tolerance level; and
    providing additional resources and suitable venues for an event of type j based on said expected number of participants μ(j) per event of type j and probability ρ(j) of at least one event of type j having no more than x(j) participants.

2. The method of claim 1, wherein the participation array M(i,j,k,l) is set for all simulation runs l, all individuals i, and all event types j, wherein l=1 to L, a total number of simulation runs, i=1 to n, a total number of individuals, and there are m event types.

3. The method of claim 2, further comprising the steps of:
    initializing an individual participation budget D to B(i), a participation budget for the i individual;
    setting Z to a largest integer which is less than or equal to D/C(j), if Z×C(j)>D, where C(j) is a cost of event j; and
    updating the individual participation budget as D=D−Z×(j).

4. The method of claim 1, further comprising calculating the expected number of participants μ(j) per event of type j from $$\mu(j) = \frac{1}{L}\sum_{l=1}^{L}\left\{\frac{1}{N(j)}\sum_{k=1}^{N(j)}\sum_{i=1}^{n} M(i, j, k, l)\right\},$$

wherein L is a total number of simulation runs.

5. The method of claim 1, further comprising calculating the probability ρ(j) of at least one event of type j having no more than x(j) participants from $$\rho(j) = \frac{1}{L}\sum_{l=1}^{L}\left[I\left\{\sum_{k=1}^{N(j)} I\left\{\sum_{i=1}^{n} M(i, j, k, l) \leq x(j)\right\} > 0\right\}\right],$$

wherein L is a total number of simulation runs, I( ) denotes an indicator function wherein I(A)=1 if condition A is satisfied and I(A)=0 otherwise, and x(j) is a participation threshold for event type j.

6. The method of claim 1, further comprising:
    receiving a pre-classified hierarchy of events of h levels for individual i wherein nodes in level u, 1≤u≤h, are indexed by $w_u=(v_1, \ldots, v_{u-1}, v_u)$, wherein $w_{u-1}=(v_1, \ldots, v_{u-1})$ is an index of a parent node and $v_u$ is the index of the child node ($v_u=1, \ldots, |w_{u-1}|$), wherein $|w_{u-1}|$=a number of children of node $w_{u-1}$, wherein each node is associated with a hierarchy score that indicates the rank of that node within a hierarchy of nodes at a same level with a common parent node;

initializing all nodes of said hierarchy of events to be unvisited and all terminal nodes of said hierarchy of events to be unranked; and starting from a root of said hierarchy of events, visiting all child nodes of said root, wherein for each child node, the method further comprises:
finding a parent node of a plurality of most preferable unranked terminal nodes;
assigning ranks to said most preferable unranked terminal nodes that are children of said parent node;
determining the highest assigned rank;
marking said parent node as visited; and
finding a next unvisited node,
wherein a vector of ranks of the terminal nodes is the preference rank R(i,j) for events of type j for individual i.

7. A system for predicting participation patterns in a plurality of events from a pool of qualified participants, comprising:
an electronic registration system that received event requests from work providers that indicate requirements of work that needs to be performed;
a participant registration system that receives bids from participants to participate in an event wherein each bid includes a participants qualifications;
a data storage device that includes a plurality of databases;
a data processing device; and
a display device,
wherein the data processing device includes a simulation engine and a key performance index (KPI) engine,
wherein the simulation engine performs a simulation and calculates a participation array M(i,j,k,l) that is a binary indicator of whether or not individual i participates in a k-th event of type j in an l-th simulation run from a number of events N(j) of type j available for participation in a given period of time,
wherein the KPI engine calculates key performance indices using the participation array M(i,j,k,l), the number of events N(j) of type j and a participation thresholds x(j) for each event of type j,
wherein the key performance indices include an expected number of participants μ(j) per event of type j, and a probability ρ(j) of at least one event of type j having no more than x(j) participants,
predicting whether a number of participants is sufficient to perform the events posted by work providers or whether there is an over or under capacity of participant demand in comparison to a supply of events, using said expected number of participants μ(j) per event of type j and probability ρ(j) of at least one event of type j having no more than x(j) participants, and
wherein, when the number of participants who bid for event requests is less than a predetermined threshold, performing marketing and advertising for the work providers to generate additional demand, and when the number of participants who bid for event requests is more than is needed to perform an event, performing marketing and advertising for the work providers to attract more participant bids.

8. The system of claim 7, wherein the simulation engine further calculates a cost C(j) of each event of type j to each participant, a binary qualification indicator Q(i, j) of individual i for events of type j, wherein 1=qualified, and 0=not qualified, an expected participation rate P(i,j) of individual i for events of type j, a participation budget B(t) of individual i, and a preference rank R(i,j) of events of type j for individual i, wherein rank 1=a most preferred event type, rank m=a least preferred event type.

9. The system of claim 8, wherein the databases stored in the data storage device include an event database, a personal database, a participation database and a key performance index (KPI) database, wherein:
the event database stores a classification scheme for events that classifies various types of events, the number of events N(j) of type j and the cost C(j) of each event of type j,
the personal database stores identifications of all members of the pool of qualified participants, the binary qualification indicator Q(i,j), the expected participation rate P(i,j), the participation budget B(i), and the preference rank R(i,j),
the participation database stores the participation array M(i,j,k,l) and participation thresholds x(i) for each event, and
the KPI database stores key performance indices.

10. The system of claim 9, wherein the simulation engine outputs the participation array M(i,j,k,l) to the participation database, and the KPI engine outputs the key performance indices to the KPI database and displays one or more of the key performance indices and the participation array using the display device.

11. The system of claim 10, wherein the expected number of participants μ(j) per event of type j is calculated as $$\mu(j) = \frac{1}{L}\sum_{l=1}^{L}\left\{\frac{1}{N(j)}\sum_{k=1}^{N(j)}\sum_{i=1}^{n}M(i,j,k,l)\right\},$$

wherein L is a total number of simulation runs, and
the probability ρ(j) of at least one event of type j having no more than x(j) participants is calculated as $$\rho(j) = \frac{1}{L}\sum_{l=1}^{L}I\left[\sum_{k=1}^{N(j)}I\left\{\sum_{i=1}^{n}M(i,j,k,l) \le x(j)\right\} > 0\right],$$

wherein L is a total number of simulation runs, I( ) denotes an indicator function wherein I(A)=1 if condition A is satisfied and I(A)=0 otherwise, and x(j) is a participation threshold for event type j.

12. The system of claim 10, wherein the simulation engine calculates the participation array M(i,j,k,l) by
initializing an individual participation budget D to B(i), the participation budget for the ith individual;
selecting an event whose preference rank r is equal to a predetermined preference rank R(i,j) for an event of type j for individual i, wherein individual i is qualified to participate in event j;
sampling a random number Z from a binomial distribution Binom(N(j), P(i,j)), wherein Z represents a number of events in which to participate, when a number N(j) of available events of type j is greater than 0 and when an expected participation rate P(i,j) of individual i for events of type j is greater than 0;
selecting a random subset S with Z elements from a set of integers {1, . . . , N(j)}, wherein subset S is an indicator that shows which Z events to participate in;
looping over k=1 to N(j) and setting a participation array M(i,j,k,l) to 1 if and only if k is contained in S, wherein participation array M(i,j,k,l) is a binary indicator of whether or not individual i participates a k-th event of type j in an l-th run of simulation; and updating the individual participation budget as $D=D-Z \times C(j)$.

13. The system of claim 12, wherein the simulation engine calculates the predetermined preference rank $R(i,j)$ by
receiving a pre-classified hierarchy of events of h levels for individual i wherein nodes in level u, $1 \leq u \leq h$, are indexed by $w_u = (v_1, \ldots, v_{n-1}, v_n)$, wherein $w_{n-1} = (v_1, \ldots, v_{n-1})$ is an index of a parent node and $v_u$ is the index of the child node $(v_u = 1, \ldots, |w_{n-1}|)$, wherein $|w_{n-1}| = $ a number of children of node $w_{n-1}$, wherein each node is associated with a hierarchy score that indicates the rank of that node within a hierarchy of nodes at a same level with a common parent node;
initializing all nodes of said hierarchy of events to be unvisited and all terminal nodes of said hierarchy of events to be unranked; and
starting from a root of said hierarchy of events, visiting all child nodes of said root, wherein for each child node, the method further comprises:
finding a parent node of a plurality of most preferable unranked terminal nodes;
assigning ranks to said most preferable unranked terminal nodes that are children of said parent node;
determining the highest assigned rank;
marking said parent node as visited; and
finding a next unvisited node,
wherein a vector of ranks of the terminal nodes is the preference rank $R(i,j)$ for events of type j for individual i.

14. A non-transitory program storage device readable by a computer, tangibly embodying a program of instructions executed by the computer to perform the method steps for predicting participation patterns in a plurality of events from a pool of qualified participants, the method comprising the steps of:
selecting an event whose preference rank r is equal to a predetermined preference rank $R(i,j)$ for an event of type j for individual i, wherein individual i is qualified to participate in event j;
sampling a random number Z from a binomial distribution Binom(N(j), P(i,j)), wherein Z represents a number of events in which to participate, when a number N(j) of available events of type j is greater than 0 and when an expected participation rate P(i, j) of individual i for events of type j is greater than 0;
selecting a random subset S with Z elements from a set of integers $\{1, \ldots, N(j)\}$, wherein subset S is an indicator that shows which Z events to participate in;
performing a simulation of the participation patterns in the plurality of events by looping over k=1 to N(j) and setting a participation array M(i,j,k,l) to 1 if and only if k is contained in S, wherein the participation array M(i,j,k,l) is a binary indicator of whether or not individual i participates a k-th event of type j in an l-th run of the simulation,
using said participation array M(i,j,k,l) to calculate an expected number of participants $\mu(j)$ per event of type j, and to calculate a probability $\rho(j)$ of at least one event of type j having no more than x(j) participants; and
generating and selecting new additional participants via directed marketing and advertising, wherein a risk of low participation of an event of type j is kept from falling below a risk tolerance level; and
providing additional resources and suitable venues for an event of type j based on said expected number of participants $\mu(j)$ per event of type j and probability $\rho(j)$ of at least one event of type j having no more than x(j) participants.

15. The computer readable program storage device of claim 14, wherein the participation array M(i,j,k,l) is set for all simulation runs l, all individuals i, and all event types j, wherein l=1 to L, a total number of simulation runs, i=1 to n, a total number of individuals, and there are m event types.

16. The computer readable program storage device of claim 15, the method further comprising the steps of:
initializing an individual participation budget D to B(i), a participation budget for the ith individual;
setting Z to a largest integer which is less than or equal to $D/C(j)$, if $Z \times C(j) > D$, where C(j) is a cost of event j; and
updating the individual participation budget as $D=D-Z \times C(j)$.

17. The computer readable program storage device of claim 14, the method further comprising calculating the expected number of participants $\mu(j)$ per event of type j from $$\mu(j) = \frac{1}{L}\sum_{l=1}^{L}\left\{\frac{1}{N(j)}\sum_{k=1}^{N(j)}\sum_{i=1}^{n}M(i,j,k,l)\right\},$$

wherein L is a total number of simulation runs.

18. The computer readable program storage device of claim 14, the method further comprising calculating the probability $\rho(j)$ of at least one event of type j having no more than x(j) participants from $$\rho(j) = \frac{1}{L}\sum_{l=1}^{L}\left[I\left\{\sum_{k=1}^{N(j)}I\left\{\sum_{i=1}^{n}M(i,j,k,l) \leq x(j)\right\} > 0\right\}\right],$$

wherein L is a total number of simulation runs, I( ) denotes an indicator function wherein I(A)=1 if condition A is satisfied and I(A)=0 otherwise, and x(j) is a participation threshold for event type j.

19. The computer readable program storage device of claim 14, the method further comprising:
receiving a pre-classified hierarchy of events of h levels for individual i wherein nodes in level u, $1 \leq u \leq h$, are indexed by $w_n = (v_1, \ldots, v_{n-1}, v_u)$, wherein $w_{n-1} = (v_1, \ldots, v_{u-1})$ is an index of a parent node and $v_u$ is the index of the child node $(v_n = 1, \ldots, |w_{n-1}|)$, wherein $|w_{n-1}| = $ a number of children of node $w_{n-1}$, wherein each node is associated with a hierarchy score that indicates the rank of that node within a hierarchy of nodes at a same level with a common parent node;
initializing all nodes of said hierarchy of events to be unvisited and all terminal nodes of said hierarchy of events to be unranked; and
starting from a root of said hierarchy of events, visiting all child nodes of said root, wherein for each child node, the method further comprises:
finding a parent node of a plurality of most preferable unranked terminal nodes;
assigning ranks to said most preferable unranked terminal nodes that are children of said parent node;
determining the highest assigned rank;
marking said parent node as visited; and
finding a next unvisited node,
wherein a vector of ranks of the terminal nodes is the preference rank $R(i,j)$ for events of type j for individual i.

* * * * *